United States Patent [19]

Skinner et al.

[11] Patent Number: 4,748,077
[45] Date of Patent: May 31, 1988

[54] NOVEL MONOFILAMENTS, FABRICS THEREOF AND RELATED PROCESS

[75] Inventors: David B. Skinner, Irmo; Larry Ballard, Columbia, both of S.C.

[73] Assignee: Shakespeare Company, Columbia, S.C.

[21] Appl. No.: 51,868

[22] Filed: May 19, 1987

[51] Int. Cl.⁴ .................. B05D 3/08; C08L 81/00; D02G 3/00

[52] U.S. Cl. .................. 428/224; 428/364; 525/189

[58] Field of Search .............. 428/364, 373; 528/388; 525/189, 420

[56] References Cited

U.S. PATENT DOCUMENTS

| | | | |
|---|---|---|---|
| 3,487,454 | 12/1969 | Oates et al. | 525/189 |
| 3,895,091 | 7/1975 | Short et al. | 264/210 F |
| 3,898,204 | 8/1975 | Short et al. | 528/388 |
| 3,912,695 | 10/1975 | Short et al. | 528/388 |
| 4,025,582 | 5/1977 | Needham | 525/189 |
| 4,029,639 | 6/1977 | Gragson et al. | 528/373 |
| 4,038,260 | 7/1977 | Campbell | 528/388 |
| 4,038,261 | 7/1977 | Crouch et al. | 528/388 |
| 4,038,262 | 7/1977 | Edmonds, Jr. | 528/388 |
| 4,098,776 | 7/1978 | Tieszen et al. | 528/373 X |
| 4,418,029 | 11/1983 | Reed et al. | 524/399 X |
| 4,421,588 | 12/1983 | Davies | 156/308.2 |
| 4,454,189 | 6/1984 | Fukata | 428/364 X |
| 4,455,410 | 6/1984 | Giles, Jr. | 525/436 |
| 4,493,917 | 1/1985 | Bailleux et al. | 524/394 |
| 4,544,700 | 10/1985 | Wright | 524/543 |
| 4,610,916 | 9/1986 | Ballard | 428/224 |
| 4,645,825 | 2/1987 | Idel et al. | 264/210.8 X |
| 4,703,088 | 10/1987 | Tieszen et al. | 525/189 |

FOREIGN PATENT DOCUMENTS

| | | | |
|---|---|---|---|
| 119040 | 9/1975 | Japan | 525/189 |
| 136847 | 10/1981 | Japan | 525/189 |
| 152953 | 8/1984 | Japan | 525/189 |

*Primary Examiner*—Lorraine T. Kendell
*Attorney, Agent, or Firm*—Renner, Kenner, Greive, Bobak & Taylor

[57] ABSTRACT

Polyphenylene sulfide blends with melt extrudable polymers form novel monofilaments. The monofilament is prepared by extruding a mixture of the linear polyphenylene sulfide and the melt extrudable polymer to form a monofilament blend, quenching the monofilament and thereafter drawing the monofilament to a ratio of from about 3:1 to 6:1. The resulting filament can be employed for the manufacture of fabric.

10 Claims, No Drawings

NOVEL MONOFILAMENTS, FABRICS THEREOF AND RELATED PROCESS

TECHNICAL FIELD

The present invention is directed toward a blend of two resins forming a novel monofilament, one resin being polyphenylene sulfide. A process for the single step extrusion of such monofilament is also provided. Industrial fabrics manufactured from these monofilaments have utility, particularly as belts on paper forming machines, and are also provided.

Polyphenylene sulfide (PPS) monofilament has been prepared using standard extrusion techniques. It has outstanding chemical and thermal resistance and thus has many potential applications as an industrial filament. In particular PPS has potential for making fabrics for use with paper forming machines. Because of the harsh chemical and thermal environment in which these fabrics are used, fabrics of PPS have extended life and better overall performance than fabrics composed of conventional materials. Despite its utility, PPS is expensive as compared to conventional materials.

BACKGROUND OF THE INVENTION

Due to the high level of crystallinity of PPS, monofilaments thereof tend to be brittle and are difficult to work with. In particular, the knot strength, loop strength and fatigue resistance of PPS monofilament are all low and result in problems during the processing of the monofilaments, especially when the monofilament is woven into fabrics. When the monofilament is removed from the quill during weaving, twists and loops form which, when tightened, kink and result in filament breaks.

The production of fibers from aromatic sulfide polymers such as PPS is discussed in U.S. Pat. No. 3,895,091 which requires a partial cure of the polymer prior to melt spinning, followed by the extrusion and drawing. High modulus, high melting, non-burning polyphenylene sulfide fibers having good corrosion resistance properties are obtained as a result.

Mixtures of PPS with various thermoplastic materials have been prepared heretofore, in an effort to improve physical properties. In general, the mixtures are not directly extrudable or have not provided the improvement desired or both.

In U.S. Pat. No. 4,421,588, PPS is blended with polyetheretherketone using diphenylsulphone as a mutual solvent. The resulting mixture, used for bearing material, has high fatigue strength and improved thermal stability but can be formed only by molding.

In U.S. Pat. No. 4,455,410, PPS is mixed with a polyetherimide for the purpose of obtaining a material with good flexural strength and better mechanical properties than PPS alone. The PPS used in the example was Ryton P-4, a molding grade resin, available from Phillips Chemical Co. and which is suitable for molding rather than extruding. The final products described in the patent were produced by extruding a mixture of the components and then molding the mixtures, i.e., a two step process.

In U.S. Pat. No. 4,493,917, PPS (Ryton P-4, molding grade material) is mixed with fluoropolymers in order to improve the properties of the fluoropolymer which in turn is reflected in a modification of the mechanical properties of the components of electrochemical reactors that are made from fluoropolymers, viz., to reduce the high temperature creep and reduce the high thermal coefficient of expansion of the fluoropolymers. The fluoropolymers specified were fully fluorinated homopolymers or perfluoroalkoxy resins. The process of preparing the components required two steps: preparing the blend by extrusion and then producing the final object by molding.

U.S. Pat. No. 4,610,916, recently issued to the Assignee of record, discloses blends of polyphenylene sulfide with copolymers comprising olefins and halogenated monomers as well as a process for reducing brittleness in polyphenylene sulfide monofilaments.

It is also known to combine polyphenylene sulfide with various polymers for other purposes. U.S. Pat. No. 4,025,582, for instance, discloses the use of polyphenylsulfide as a ultraviolet stabilizer for polyolefin blends. The olefins are those having from 2 to 8 carbon atoms. The amount of polyphenylene sulfide is disclosed at 1 to 10 weight percent and its particle size distribution is such that it passes through a sieve of 100 to 200 mesh (U.S. Sieve).

U.S. Pat. No. 4,454,189 discloses fibrous sheets of copolymerized polyphenylene sulfide filaments with a thermosetting resin and a process for producing the same. The sheet is formed by conveying electrostatically charged extrudated polyphenylene sulfide filaments from small holes by a high velocity air stream. Interlocking is accomplished by needle punching or use of a water jet. The resultant sheets are useful as industrial filters, heat insulating materials, and electrical insulating materials.

U.S. Pat. No. 4,544,700 discloses a polyarylene sulfide composition containing polyphenylene sulfide, a low density ethylene polymer, and a reinforcing material such as glass or carbon fibers. The amount of polyphenylene sulfide is disclosed at 50 to 65 weight percent. The composition is injection molded by extrusion at an elevated temperature. The resultant compositions are useful as molding compositions for thick walled articles.

Thus, it will be seen that the present invention has provided improved properties for polyphenylene sulfidecontaining monofilaments by the addition of various polymers to form blends. Among these properties are better fatigue resistance and increased tenacity without sacrifice of chemical resistance or significantly lowering the use temperature. Also the extrudability of this monofilament has been improved by the process of the invention. Moreover, with the exception of U.S. Pat. No. 4,610,916, extrudability has not been satisfactorily addressed by the art discussed herein.

DISCLOSURE OF THE INVENTION

It is therefore an object of the present invention to provide a blend of polyphenylene sulfide with one of a group of polymers to provide a monofilament having improved physical properties.

It is another object of the present invention to provide a blend of polyphenylene sulfide that is less expensive than polyphenylene sulfide alone and some blends thereof.

It is another object of the present invention to provide a process for improving the physical properties of polyphenylene sulfide resins.

It is yet another object to provide a novel fabric at least partially containing a monofilament of the present invention which is formed by a blend of polyphenylene sulfide and one of a group of melt extrudable polymers presented hereinbelow.

Thus, the present invention provides a novel monofilament that comprises from about 50 to 99 parts by weight of a linear polyphenylene sulfide, and from about 1 to 50 parts by weight of a melt extrudable polymer selected from the group of non-halogenated olefin polymers and copolymers.

Another novel filament comprises from about 50 to 99 parts by weight of a linear polyphenylene sulfide and from about 1 to 50 parts by weight of a halogenated homopolymer.

Yet another novel filament comprises from about 50 to 99 parts by weight of a linear polyphenylene sulfide and from about 1 to 50 parts by weight of an ionomer resin.

Still another novel filament comprises from about 50 to 99 parts by weight of a linear polyphenylene sulfide and from about 1 to 50 parts by weight of an aromatic aliphatic polyamide resin or an aliphatic aromatic polyamide resin.

The present invention also provides novel fabrics at least partially containing monofilaments comprising the foregoing polyphenylene sulfide blends.

Another aspect of the present invention provides a process for preparing polyphenylene sulfide monofilament which includes the steps of extruding a mixture of from about 50 to 99 parts by weight of a linear polyphenylene sulfide and from about 1 to 50 parts by weight of a melt extrudable polymer selected from the group consisting of non-halogenated olefin polymers and copolymers to form a monofilament blend and thereafter drawing the monofilament to a ratio of from about 3:1 to 6:1.

A similar process for preparing polyphenylene sulfide monofilament includes the steps of extruding a mixture of from about 50 to 99 parts by weight of a linear polyphenylene sulfide and from about 1 to 50 parts by weight of a halogenated homopolymer to form a monofilament blend 5 and thereafter drawing the monofilament to a ratio of from about 3:1 to 6:1.

Yet another process for preparing polyphenylene sulfide monofilament includes the steps of extruding a mixture of from about 50 to 99 parts by weight of a linear polyphenylene sulfide and from about 1 to 50 parts by weight of an ionomer resin to form a monofilament blend and thereafter drawing the monofilament to a ratio of from about 3:1 to 6:1.

Still another process for preparing polyphenylene sulfide monofilament includes the steps of extruding a mixture of from about 50 to 99 parts by weight of a linear polyphenylene sulfide and from about 1 to 50 parts by weight of an aromatic aliphatic polyamide resin or aliphatic aromatic polyamide resin to form a monofilament blend and thereafter drawing the monofilament to a ratio of from about 3:1 to 6:1.

PREFERRED EMBODIMENT FOR CARRYING OUT THE INVENTION

Due to the inherent brittleness of PPS fibers, fabrics of commercial value have been limited to fabrics woven from a staple yarn or articles manufactured without stressing the filaments, such as non-wovens or needle punched felts. Efforts in the art to produce PPS monofilaments having improved physical properties acceptable for weaving have centered on preparing blends of PPS with various thermoplastic resins. U.S. Pat. No. 4,610,916 discussed hereinabove teaches improvement in PPS monofilament brittleness by blending PPS with a particular classification of resins defined as a melt extrudable copolymer consisting essentially of an olefin and halogenated monomer, e.g., a polyethylene-tetrafluoroethylene copolymer.

The fibers defined by U.S. Pat. No. 4,610,916 have been successfully woven into fabrics; however, the fibers are expensive based on market demand. The present invention identifies four classes of relatively inexpensive resins which when blended with PPS, can be extruded into novel monofilaments which have better loop strength, knot strength, and fatigue resistance. The results are unexpected considering that in the majority of the instances where PPS has been blended with various thermoplastics, the corresponding monofilament has exhibited an increase in brittleness.

The PPS material utilized in the monofilament of the present invention must be melt extrudable and thus will have a melt index of from about 100 to about 300 and preferably from about 150 to about 200. One particularly suitable PPS material is commercially available as Ryton GRO2 in pellet form from Phillips Chemical Co., Ryton being a registered trademark.

The second resin forming the monofilament comprises a melt extrudable polymer selected from one of four general classes. The first of these classes provides non-halogenated polymers and copolymers of olefins. Suitable olefin monomers are those having the formula

where R is H or an alkyl group having from 1 to about 6 carbon atoms, and which contain one double bond per monomer unit. Typical examples of polymers include low and high density polyethylene, polypropylene, polymethyl pentene, poly 1-butene and the like and copolymers such as ethylene/propylene copolymer and 1-butene ethylene copolymer. Aromatic species such as styrene are not included within the specified class of olefins and, as noted hereinabove, neither the olefin monomer nor the corresponding polymer members of the class are halogenated.

As noted hereinabove, the non-halogenated polymers and copolymers comprise broadly from about 1 to 50 parts by weight of the polymer blend and specifically from about 5 to 15 parts with about 10 parts being preferred. Accordingly, the polyphenylene sulfide comprises broadly from about 50 to 99 parts by weight of the polymer blend specifically, about 85 to 95 parts and preferably about 90. Particularly suitable polymers include polyethylene and polypropylene as well as copolymers thereof and preferably those copolymers having 1 to 3 percent polyethylene.

The second class provides halogenated homopolymers having from about 2 to 8 carbon atoms and containing fluorine or chlorine or both as the halogen. Typical examples of these homopolymers include polyvinylidene fluoride, polyvinyl fluoride, polyvinyl chloride, polychlorotrifluoroethylene as well as polymers of hexafluoropropylene and the like. The halogenated homopolymers comprise broadly from about 1 to 50 parts by weight of the polymer blend and specifically from about 15 to 30 parts and preferably about 25 parts. Accordingly, the polyphenylene sulfide comprises broadly from about 50 to 99 parts by weight of the polymer blend, specifically about 70 to 85 parts and preferably about 75 parts.

The third class of blendable polymers provides ionomer resins which are defined in *The Condensed Chemical Dictionary*, tenth ed. Van Nostrand Reinhold Company (1981) at pg. 568 as a copolymer of ethylene and a vinyl monomer with an acid group such as methacrylic acid. When crosslinked, the polymers have both ionic and covalent bonds and the polymers are polar, containing positively and negatively charged groups which are not associated with each other.

One particularly useful member of this class is the ionomer resin Surlyn. Surlyn is a registered trademark of E. I. duPont de Nemours & Co. for a thermoplastic produced as a granular material. Physical properties include: Izod impact strength 5.7 to 14.6 ft-lb/in (304.4 to 779.6 J/m); tensile strength 3500 to 5000 psi (24.15 to 34.5 MPa); elongation 300 to 400% and softening point 71° C. The repeating unit for the Surlyn resin is believed to be

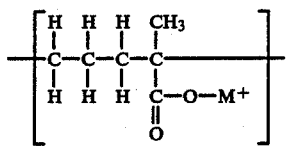

where M is a metal such as sodium or zinc. Approximately 75 to 95 percent of the resin has these repeating units.

Another useful member of this class is ethylene ethyl acrylate (EEA) copolymer which results from the copolymerization of ethylene with ethyl acrylate. The comonomer structure is

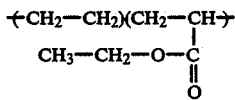

The ionomer resins comprise broadly from about 1 to 50 parts by weight of the polymer blend and specifically from about 10 to 20 parts with about 15 parts preferred. Accordingly, the polyphenylene sulfide comprises broadly from about 50 to 99 parts by weight of the polymer blend, specifically about 80 to 90 parts and preferably about 85 parts.

The fourth class of blendable polymers provides two types, aromatic aliphatic polyamides and aliphatic aromatic polyamides. The diacid and diamine monomers contain from 5 to 36 carbon atoms. Such polymers are more commonly known as nylons. Nylon filaments are crystalline, having a high tensile strength, up to 8 grams per denier or about 100,000 psi (690 MPa). Aromatic aliphatic nylons as well as aliphatic aromatic nylons are composed of a diacid monomer and a diamine monomer, one of which has an aromatic structure.

The aliphatic diacid monomers have the general formula

where n is from about 3 to 34, and include diacids such as adipic, azelaic, sebacic, dodecanedioic and the like.

The aromatic diacid monomers have the general formula

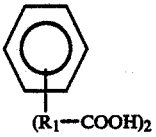

where $R_1$ is an alkyl group having from 0 to about 5 carbon atoms and include diacids such as terephthalic and isophthalic acid.

The aliphatic diamine monomers have the general formula

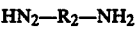

where $R_2$ is selected from the group consisting of alkyl groups having from about 3 to 34 carbon atoms and cycloaliphatic groups having from 4 to about 7 carbon atoms where the amines are attached through an alkyl group, having from 1 to about 5 carbon atoms, to the ring. Exemplary members include 1,6-hexane diamine and 1-3 bis aminomethyl cyclohexane, respectively.

The aromatic diamine monomers have the general formula

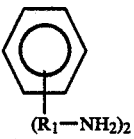

where $R_1$ is an alkyl group having from 1 to about 5 carbon atoms and include, for instance, metaxylylene diamine and paraxylylene diamine.

An example useful for practice of the present invention is polymetaxylylene adipamide (MXDA-6). Partially aromatic polyamides, such as MXDA-6, have a particular advantage compared to fully aliphatic polyamides. Because of their partial aromatic structure, the aromatic aliphatic polyamides are more compatible with PPS than the fully aliphatic polyamides such as nylon 66. This increased compatibility results in more efficient blending and overall improved physical properties of the blended resins.

The aromatic aliphatic polyamide polymers broadly comprise from about 1 to 50 parts by weight of the polymer blend and specifically from about 1 to 10 parts with about 5 parts preferred. Accordingly, the polyphenylene sulfide comprises broadly from about 50 to 99 parts by weight of the polymer blend, specifically about 90 to 99 parts and preferably about 95 parts.

With respect to the extrusion process, the monofilament is produced by extruding the two resins together in one continuous step. The two resins are loaded into the extruder hopper and from there fed into a single screw extruder. The melting and intimate blending of the resin mixture takes place in the extruder at a temperature of about 285° C. as the screw conveys the resin mixture forward. The molten and thoroughly blended resin is fed into a metering pump which forces the molten resin through a die to form molten filaments. More particularly, the extrusion temperature ranges between about 285° to 325° C. with 294° to 310° C. being preferred.

Prior to drawing, the monofilament is quenched in hot air or a waterbath so that solid filaments are formed.

Thereafter, the solid filaments are drawn in water or air at room (20° C.) or elevated temperatures up to about 100° C. between a set of draw rolls to a ratio of from about 3:1 to 6:1 and the drawn filaments are allowed to relax from about 0 to 15 percent by passing them through the relaxing stage. The finished filaments are then wound onto spools. Unlike existing processes, which require the blend to be formed first and thereafter chopped, melted and extruded or otherwise molded, the process of the present invention goes from the resin mixture directly to the monofilament.

In order to produce a quality monofilament, it is necessary that the blend of resins after extrusion be homogeneous. In contrast to the blend described in U.S. Pat. No. 4,493,917, whereby the extrusion produced a network of interconnected and interpenetrating fibers of filler within the matrix, the blend of resins in the present invention is uniform and homogeneous. Such a uniform blend is necessary in order to produce monofilaments with uniform properties and uniform diameters.

Monofilaments described by the present invention were produced according to the foregoing process and have been set forth hereinbelow as Example Nos. 1 to 14. A control comprising 100 parts of polyphenylene sulfide, was extruded into monofilament. It and Example Nos. 1 to 14 were subjected to physical testing, the results of which are reported in the Tables hereinbelow.

In the work reported herein, the monofilament (Control) and monofilament blends (Example Nos. 1 to 15) were produced with polyphenylene sulfide (Ryton GRO2) pellets discussed hereinabove. As the blendable thermoplastic polymers, the following products were employed: El Rexene, ethylene-propylene copolymer available from El Paso Products Co.; Marlex, polyethylene having a melt index of 0.2. Marlex is a registered trademark of Phillips Petroleum Co.; Shell 5C13, a polypropylene available from Shell Chemical Co.; Surlyn 8528 from duPont; MXDA-6 from Shakespeare Company; and, Kynar, a polyvinylidene chloride (PVDC) thermoplastic from Pennwalt.

A uniform mixture of the two polymers (A parts of Ryton and B parts of blendable polymer) was placed in the extruder hopper and extruded in a normal fashion. The extruder employed was a 6.3 cm single screw extruder having 10 holes at the die of 1.397 mm diameter. The extruder temperatures were as follows, unless otherwise noted:

|  |  |
|---|---|
| First heater zone | 288° C. |
| Second heater zone | 293° C. |
| Third heater zone | 293° C. |
| Fourth heater zone | 296° C. |
| Fifth heater zone | 291° C. |
| Extruder neck | 291° C. |
| Extruder heat | 291° C. |
| Extruder die | 291° C. |

The extruder output was approximately 7.7 kilograms per hour and the final monofilament size was 15.7 mils (392.5 microns). The monofilament was quenched in a water bath at 66° C. positioned 5 cm below the extruder die. The quenched monofilament was drawn in a waterbath at a temperature of about 93° C. with a draw ratio of 3.7:1 and then allowed to relax 1.6 percent at a temperature of 121° C., all unless otherwise noted. The finished monofilament was placed on spools for testing. The Ryton material was pre-dried prior to blending at 137.7° C. for 3 hours; however, pre-drying is not a necessary step for practice of the present invention.

Blend ratios appear in the more detailed description for each example. All of the values are illustrative and are not to be considered limiting. All parts are given as parts by weight and total 100.

CONTROL

A monofilament was produced by extruding in a single step polyphenylene sulfide (Ryton GRO2) pellets. Screw pressure was 1400 psi (9.66 MPa).

EXAMPLE NO. 1

A monofilament blend was produced by feeding a uniform mixture of 95 parts Ryton and 5 parts of polyethylene to the extruder. Screw and die pressures were 1400 psi (9.66 MPa) and 950 psi (6.55 MPa), respectively; screw speed was 21.4 to 21.5 rpm.

EXAMPLE NO. 2

A monofilament blend was produced by feeding a uniform mixture of 95 parts Ryton and 5 parts of polypropylene to the extruder. Screw and die pressures were 1400 psi (9.66 MPa) and 1600 psi (11.04 MPa), respectively; screw speed was 21.5 to 21.9 rpm.

EXAMPLE NO. 3

A monofilament blend was produced by feeding a uniform mixture of 90 parts Ryton and 10 parts of polypropylene to the extruder. Screw and die pressures were 1400 psi (9.66 MPa).

EXAMPLE NO. 4

A monofilament blend was produced by feeding a uniform mixture of 95 parts Ryton and 5 parts of poly-(ethylene-propylene) copolymer to the extruder. Screw and die pressures were 1500 psi (10.35 MPa) and 700 psi (4.83 MPa), respectively. Screw speed was 20.3 to 20.5 rpm.

EXAMPLE NO. 5

A monofilament blend was produced by feeding a uniform mixture of 95 parts Ryton and 5 parts of poly-(ethylene-propylene) copolymer to the extruder. Screw and die pressures were 1200 psi (8.28 MPa) and 700 psi (4.83 MPa), respectively. Screw speed was 17.7 to 17.9 rpm. Draw ratio differed slightly from Example No. 4 at 3.87:1 as did the temperatures in the first and last zones at 282° and 277° C., respectively.

EXAMPLE NO. 6

A monofilament blend was produced by feeding a uniform mixture of 90 parts Ryton and 10 parts poly-(ethylene-propylene) copolymer to the extruder. Screw and die pressures were 1400 psi (9.66 MPa) and 700 psi (4.83 MPa), respectively. Screw speed was 20.6 to 20.7 rpm.

EXAMPLE NO. 7

A monofilament blend was produced by feeding a uniform mixture of 90 parts Ryton and 10 parts poly-(ethylene-propylene) copolymer to the extruder. Screw and die pressures were 1200 psi (8.28 MPa) and 800 psi (5.52 MPa), respectively. Screw speed was 17.7 to 17.9 rpm. Draw ratio differed slightly from Example No. 6 at 3.87:1 as did the temperatures in the first and last zones at 282° and 277° C., respectively.

EXAMPLE NO. 8

A monofilament blend was produced by feeding a uniform mixture of 85 parts Ryton and 15 parts poly(ethylene-propylene) copolymer to the extruder. Screw and die pressures were 1200 psi (8.28 MPa) and 570 psi (3.93 MPa), respectively. Screw speed was 17.4 to 17.6 rpm. Draw ratio was 3.87:1 and temperatures in the first and last zones were 282° and 277° C., respectively.

EXAMPLE NO. 9

A monofilament blend was produced by feeding a uniform mixture of 80 parts Ryton and 20 parts poly(ethylene-propylene) copolymer to the extruder. Screw and die pressures were 1200 psi (8.28 MPa) and 550 psi (3.8 MPa), respectively. Screw speed was 16.9 to 17.1 rpm. Draw ratio was 3.87:1 and temperatures in the first and last zones were 282° and 277° C., respectively.

EXAMPLE NO. 10

A monofilament blend was produced by feeding a uniform mixture of 70 parts Ryton and 30 parts poly(ethylene-propylene) copolymer to the extruder. Draw ratio was 3.87:1 and temperatures in the first and last zones were 282° and 277° C.

EXAMPLE NO. 11

A monofilament blend was produced by feeding a uniform mixture of 60 parts Ryton and 40 parts poly(ethylene-propylene) copolymer to the extruder. Draw ratio was 3.87:1 and temperatures in the first and last zones were 282° and 277° C., respectively.

EXAMPLE NO. 12

A monofilament blend was produced by feeding a uniform mixture of 80 parts Ryton and 20 parts Surlyn 8528; resin to the extruder. The draw ratio was 3.83:1.

EXAMPLE NO. 13

A monofilament blend was produced by feeding a uniform mixture of 95 parts Ryton and 5 parts of polymetaxylylene adipamide (MXDA) to the extruder. Screw pressure was 1400 psi (9.66 MPa).

EXAMPLE NO. 14

A monofilament blend was produced by feeding a uniform mixture of 80 parts Ryton and 20 parts of polyvinylidene fluoride (PVDF) to the extruder.

EXAMPLE NO. 15

A monofilament blend was produced by feeding a uniform mixture of 60 parts Ryton and 40 parts of polyvinylidene flouride (PVDF) to the extruder.

Monofilaments comprising the 15 different blends and the Control were subjected to physical testing, the results of which have been presented in Tables I–III hereinbelow. Tests of 10 monofilaments provided a range of values from which an average was determined and reported in the Tables.

Tensile strength was determined according to ASTM method D-885. Squirrel cage fatigue tests were conducted in a squirrel cage abrader which consists of twelve equally spaced carbon steel bars on a 14.3 cm diameter bolt circle rotating about a common axis. Each bar is 3.8 mm diameter and 24.8 cm long with its axis parallel to a central axis. Each yarn is tied to a microswitch by means of a slip knot and then draped over the bars and pretensioned with a free hanging weight. The micro switch is pretensioned so that a maximum of 19 cm of yarn is contacted by the bars at any one time. The free hanging weights weigh 250 grams each and up to eight yarns can be tested at one time. The bars rotate about the common axis at 100 rpm for 50 minutes. The yarns are then removed and the tensile measured in an Instron device. The average tensile of the test yarns is divided by the tensile of the yarn which has not been fatigued, and recorded as a percent tensile retention.

Sandpaper abrasion test equipment consists of a continuously moving strip of sandpaper wrapped more than 180° around a support roll (3.2 cm diameter). The axis of the support roll is parallel to the floor. Guide rollers allow the test filament to contact 2.5 linear cm of sandpaper. The 320J grit sandpaper moves at 4 inches per minute in a direction that results in an upward force on the filament. A downward force is maintained by tensioning the yarn with 150 grams of free hanging weight. The filament cycles clockwise and counterclockwise on the sandpaper with a traverse length of 3 cm. The filament is connected to a timer via a microswitch which stops when the filament breaks. Results are recorded as cycles to break.

TABLE I

Physical Properties
Ryton Monofilament vs. Ryton/Polymer Blends

| | Control $R^a$ (100/0) | Ex. 1 R/PE[b] (95/5) | Ex. 2 R/PP[c] (95/5) | Ex. 3 R/PP (90/10) |
|---|---|---|---|---|
| Tensile (Kg) | 3.44 | 3.16 | 3.22 | 3.32 |
| Elongation at break (%) | 23.6 | 46.5 | 49.3 | 51.1 |
| Loop strength (Kg) | 2.10 | 4.01 | 4.87 | 4.68 |
| % breaking strength | 61.0 | 127.0 | 151.3 | 141.2 |
| Loop elongation (%) | 2.2 | 27.3 | 37.2 | 33.6 |
| % break elongation | 9.3 | 58.7 | 75.5 | 65.8 |
| Squirrel cage fatigue tensile retention (Kg) | 1.65 | 1.94 | 2.04 | 2.53 |
| % of breaking strength | 48.0 | 61.3 | 63.2 | 76.3 |
| Knot strength (Kg) | 1.83 | 2.59 | 2.99 | 2.76 |
| % of breaking strength | 53.2 | 81.8 | 93.0 | 83.3 |
| Knot elongation (%) | 13.6 | 40.3 | 46.5 | 41.5 |
| % of break elongation | 57.6 | 86.7 | 94.3 | 81.2 |
| Sandpaper abrasion[d] | 146.9 | 127.6 | 119.3 | 127.4 |

[a]R = Ryton
[b]PE = Polyethylene
[c]PP—Polypropylene
[d]Cycles to break

TABLE II

Physical Properties
Ryton Monofilament vs. Ryton/Copolymer Blends

| | Control $R^a$ (100/0) | Ex. 4 R/PEPP[b] (95/5) | Ex. 5 R/PEPP[c] (95/5) | Ex. 6 R/PEPP (90/10) | Ex. 7 R/PEPP (90/10) | Ex. 8 R/PEPP[c] (85/15) | Ex. 9 R/PEPP (80/20) | Ex. 10 R/PEPP (70/30) | Ex. 11 R/PEPP (60/40) |
|---|---|---|---|---|---|---|---|---|---|
| Tensile (Kg) | 3.44 | 3.50 | 3.66 | 3.30 | 3.79 | 3.56 | 3.58 | 3.48 | 2.60 |
| Elongation at break (%) | 23.60 | 44.36 | 28.3 | 49.18 | 29.5 | 30.4 | 26.0 | 36.8 | 25.7 |
| Loop strength (Kg) | 2.10 | 4.58 | 2.89 | 4.20 | 3.04 | 2.95 | 2.53 | 3.40 | 2.64 |
| % of breaking strength | 61.0 | 131.0 | 79.0 | 127.4 | 80.2 | 82.9 | 70.7 | 97.8 | 100.1 |
| Loop elongation (%) | 2.2 | 26.91 | 4.4 | 27.1 | 5.6 | 6.0 | 3.5 | 13.5 | 6.3 |
| % of break elongation | 9.3 | 60.7 | 15.5 | 55.1 | 19.0 | 19.7 | 13.5 | 36.7 | 24.5 |

TABLE II-continued

Physical Properties
Ryton Monofilament vs. Ryton/Copolymer Blends

| | Control $R^a$ (100/0) | Ex. 4 R/PEPP$^b$ (95/5) | Ex. 5 R/PEPP$^c$ (95/5) | Ex. 6 R/PEPP (90/10) | Ex. 7 R/PEPP$^c$ (90/10) | Ex. 8 R/PEPP (85/15) | Ex. 9 R/PEPP (80/20) | Ex. 10 R/PEPP (70/30) | Ex. 11 R/PEPP (60/40) |
|---|---|---|---|---|---|---|---|---|---|
| Squirrel cage fatique tensile retention (Kg) | 1.65 | 3.20 | 2.94 | 2.96 | 3.32 | 2.43 | 0.31 | 1.19 | 0.00 |
| % of breaking strength | 48.0 | 91.4 | 80.2 | 89.8 | 87.6 | 68.3 | 8.7 | 34.2 | 0.00 |
| Knot strength (Kg) | 1.83 | 2.74 | 2.60 | 2.86 | 2.45 | 2.49 | 2.07 | 2.62 | 2.09 |
| % of breaking strength | 53.2 | 80.5 | 71.0 | 86.8 | 64.6 | 69.9 | 57.8 | 65.2 | 68.5 |
| Knot elongation (%) | 13.6 | 35.7 | 23.4 | 42.7 | 21.2 | 23.7 | 16.2 | 24.0 | 17.6 |
| % of break elongation | 57.6 | 80.5 | 82.7 | 86.8 | 71.9 | 78.0 | 62.3 | 65.2 | 68.5 |
| Sandpaper abrasion$^d$ | 146.9 | 134.2 | 109.5 | 133.0 | 120.6 | 117.1 | 117.1 | 123.0 | 106.0 |

$^a$R = Ryton
$^b$PEPP = poly(ethylene-propylene)
$^c$Lower extrusion temperatures
$^d$Cycles to break

TABLE III

Physical Properties
Ryton Monofilament vs. Ryton/Blends

| | Control $R^a$ (100/0) | Ex. 12 R/I$^b$ (80/20) | Ex. 13 R/MXDA$^c$ (95/5) | Ex. 14 R/PVDF$^d$ (80/20) | Ex. 15 R/PVDF$^d$ (60/40) |
|---|---|---|---|---|---|
| Tensile (Kg) | 3.44 | 3.17 | 3.58 | 2.86 | 2.03 |
| Elongation at break (%) | 23.6 | 28.5 | 43.75 | 28.37 | 30.9 |
| Loop strength (Kg) | 2.10 | 2.23 | 4.05 | 1.85 | 1.66 |
| % of breaking strength | 61.0 | 70.4 | 113.0 | 64.6 | 81.8 |
| Loop elongation (%) | 2.2 | 3.54 | 21.58 | 2.33 | 2.3 |
| % of break elongation | 9.3 | 12.4 | 49.3 | 8.2 | 7.4 |
| Squirrel cage fatigue tensile retention (Kg) | 1.65 | 2.27 | 2.40 | 1.46 | 1.70 |
| % of breaking strength | 48.0 | 72.4 | 67.0 | 51.1 | 83.6 |
| Knot strength (Kg) | 1.83 | 1.98 | 4.05 | 1.80 | 1.53 |
| % of breaking strength | 53.2 | 62.4 | 113.0 | 63.0 | 75.4 |
| Knot elongation (%) | 13.6 | 16.34 | 21.58 | 14.8 | 16.9 |
| % of knot elongation | 57.6 | 57.3 | 49.3 | 52.2 | 54.7 |
| Sandpaper abrasion$^e$ | 146.9 | — | 139.8 | 111.1 | 119.0 |

$^a$R = Ryton
$^b$I—ionomer (Surlyn 8528)
$^c$MXDA—polymetaxylylene adipamide
$^d$PVDF—polyvinylidene fluoride
$^e$Cycles to break As can be determined from the data reported in the Tables, physical properties were generally at least as good as the Control, unblended Ryton, and occasionally were improved. Particularly significant were the blends with polypropylene/polyethylene copolymer (Examples No. 4–11) which performed well in both the Squirrel cage fatigue and the Sandpaper abrasion tests. Considering that the copolymer is currently about one-tenth the cost of polyphenylene sulfide, the costs savings that can be realized by practice of the present invention are important.

In order to establish chemical resistance of the monofilament blend, a blend comprising PPS/PEPP (90/10) was tested and found to exhibit an initial tensile strength of 8.2 pounds (3.72 kg). A length was aged in 35% HCl for 24 hours at 80° C. and found to exhibit a tensile strength of 8.4 pounds (3.81 kg). Another length was aged in 10% NaOH for 24 hours at 80° C. and found to exhibit a tensile strength of 8.2 pounds (3.72 kg). In essence, neither exposure has a deleterious effect on the monofilament blend.

Thus, the monofilament blends described herein could be readily woven into a fabric which would be suitable for industrial purposes such as dryer belts utilized in paper making processes.

The fabric referred to herein is formed by weaving two filaments systems, i.e., lengthwise yarn (warp) and crosswise yarn (fill), at least one of which is a monofilament system, in a repeated pattern. Possible patterns include the plain weave in which the filling yarn passes alternately over and under each warp yarn, the twill weave which is formed by interlacing warp and fill so that the filling yarn passes alternately over and under two or more warp yarns, and the satin weave which is formed so that there are more filling yarns on the face than on the inside of the fabric. Variations of these patterns are possible which include combinations of the basic patterns. In addition to these one layer fabrics, fabrics can be woven having two or more layers. Further still, spiral fabrics can be manufactured of the type described in U.S. Pat. No. 4,423,543.

As will be appreciated by those skilled in the art, fabrics can be woven flat and then seamed to form an endless belt or can be woven as an endless belt so that no seam is necessary. It is to be understood that the monofilament of this invention can be used for part or all of the filaments in any of the fabrics described hereinabove. One suggested use for the fabrics of the present invention is in the paper industry where fabrics were originally made from metal wires. Metal wire fabrics have been largely replaced by fabrics made from synthetic materials such as polyester and nylon because the synthetic materials result in longer life-times for the belts. In some environments, i.e., where high temperatures and corrosive chemicals are present, the ordinary synthetics are not suitable. For this reason materials such as Ryton, which have good chemical and temperature resistance, have been used with success in hostile environments. However, as discussed above, Ryton alone is difficult to work with because it is very brittle. Fabrics prepared from the blends discussed herein have been constructed with no difficulty and have, therefore, substantially eliminated the problems encountered with Ryton.

The known fabrics described hereinabove have been used for the most part on paper forming machines. In these instances, the fabrics are formed into endless belts which are in continuous motion on the paper machine as the paper is formed. It is to be understood that such fabrics also have applications for filter media in situations where the fabric is stationary. The fabrics described in the present invention are prepared from filaments with diameters ranging from 10 mils to 40 mils and have dimensions ranging from 100 to 400 inches wide (254 to 1016 cm) and from 100 to 300 feet long (30.5 to 91.5 m). As indicated above, part of the fabric can comprise the novel monofilament, as warp or fill, or the fabric can be totally manufactured from the novel monofilament (warp and fill). Fabrics of this invention can be utilized on paper forming machines, as filter media and other applications.

In conclusion, it should be clear from the foregoing examples and specification disclosure that the monofilaments of the present invention can exhibit improved physical properties as compared to polyphenylene sulfide monofilaments, particularly in the improvement of fatigue resistance without sacrifice of other important properties. The improvement in fatigue resistance is manifested especially by the increase in tensile retention of the monofilament blends containing unhalogenated polymers. Compared to the unblended Ryton monofilament Control, the monofilament of Example No. 4 exhibited an increase to 91.4% as compared against 48%. As a practical matter, because of the improved fatigue resistance, monofilament of the present invention can be readily woven into fabrics to provide increased fabric life as compared with monofilament consisting of unblended Ryton.

Moreover, as the data also establishes, desirable physical properties were generally not diminished over the values possessed solely by polyphenylene sulfide when the latter was blended with various polymer resins. Accordingly, a reduction in cost can be obtained without sacrifice of useful properties.

It is to be understood that the use of melt extrudable copolymers is not limited to the specific polymers exemplified herein or by the disclosure of typical polymers provided herein, the examples having been provided merely to demonstrate practice of the subject invention. Those skilled in the art may readily select other melt extrudable polymers according to the disclosure made hereinabove.

Similarly, practice of the process of the present invention should not be limited to any particular extruder, extrusion temperatures, quench temperature, draw ratio or relaxation ratio from the exemplification it being understood by those skilled in the art that accommodations can be made within the spirit of the invention for differences in equipment as well as in the desired composition and physical properties of the monofilament.

Lastly, it should be appreciated that the monofilaments described herein shall have utility in woven fabric as well as in end-products made therefrom such as paper making belts. Both fabric and related end-products shall have improved physical properties over conventional fabrics composed of nylon and polyester filaments that have been utilized heretofore in similar embodiments.

Thus, it is believed that any of the variables disclosed herein can readily be determined and controlled without departing from the scope of the invention herein disclosed and described. Moreover, the scope of the invention shall include all modifications and variations that fall within the scope of the attached claims.

We claim:

1. A monofilament formed by a blend of two resins comprising:
   from about 50 to 99 parts by weight of a linear polyphenylene sulfide; and
   from about 1 to 50 parts by weight of a melt extrudable polymer selected from the group consisting of non-halogenated olefin polymers.

2. A monofilament, as set forth in claim 1, wherein said non-halogenated polymer is selected from the group consisting of homopolymers and copolymers of olefin monomers having the formula

where R is H or an alkyl group having from 1 to about 6 carbon atoms, and which contain one double bond per monomer unit.

3. A monofilament, as set forth in claim 2, wherein said melt extrudable polymer is selected from the group consisting of polyethylene, polypropylene and copolymers thereof.

4. A monofilament, as set forth in claim 3, comprising from about 85 to 95 parts by weight of said polyphenylene sulfide and from about 5 to 15 parts by weight of said polymer.

5. A monofilament, as set forth in claim 4, wherein said melt extrudable copolymer comprises poly(ethylene-propylene) having from about 1 to 3 percent by weight ethylene.

6. A fabric at least partially containing a monofilament formed by a blend of two resins comprising:
   from about 50 to 99 parts by weight of a linear, melt extrudable polyphenylene sulfide; and
   from about 1 to 50 parts by weight of a melt extrudable non-halogenated polymer selected from the group consisting of olefin polymers.

7. A fabric, as set forth in claim 6, wherein said non-halogenated polymer is selected from the group consisting of homopolymers and copolymers of olefin monomers having the formula

where R is H or an alkyl group having from 1 to about 6 carbon atoms, and which contain one double bond per monomer unit.

8. A fabric, as set forth in claim 7, wherein said melt extrudable polymer is selected from the group consisting of polyethylene, polypropylene and copolymers thereof.

9. A fabric, as set forth in claim 8, wherein said monofilament comprises from about 85 to 95 parts by weight of said polyphenylene sulfide and from about 5 to 15 parts by weight of said polymer.

10. A fabric, as set forth in claim 9, wherein said melt extrudable copolymer comprises poly(ethylene-propylene) having from about 1 to 3 percent by weight ethylene.

* * * * *